United States Patent
Pan et al.

(10) Patent No.: US 12,488,977 B2
(45) Date of Patent: Dec. 2, 2025

(54) VACUUM CHAMBER AND CABIN DOOR STRUCTURE

(71) Applicant: ZYBIO INC., Chongqing (CN)

(72) Inventors: Nengke Pan, Chongqing (CN); Yunfei Wang, Chongqing (CN)

(73) Assignee: ZYBIO INC., Chongqing (CN)

( * ) Notice: Subject to any disclaimer, the term of this patent is extended or adjusted under 35 U.S.C. 154(b) by 328 days.

(21) Appl. No.: 18/189,221

(22) Filed: Mar. 24, 2023

(65) Prior Publication Data

US 2023/0228782 A1 Jul. 20, 2023

Related U.S. Application Data

(63) Continuation of application No. PCT/CN2021/096737, filed on May 28, 2021.

(30) Foreign Application Priority Data

Sep. 30, 2020 (CN) .......................... 202011063421.0

(51) Int. Cl.
  *H01J 49/04* (2006.01)
  *G01N 35/04* (2006.01)
  *G01N 35/00* (2006.01)

(52) U.S. Cl.
  CPC .......... *H01J 49/0495* (2013.01); *G01N 35/04* (2013.01); *G01N 2035/00316* (2013.01); *G01N 2035/0405* (2013.01)

(58) Field of Classification Search
  CPC .................................................. H01J 49/0495
  See application file for complete search history.

(56) References Cited

U.S. PATENT DOCUMENTS

| 4,699,555 A | * | 10/1987 | Guarino | H01J 37/20 |
| | | | | 414/217 |
| 7,982,568 B2 | * | 7/2011 | Fullerton | E05C 19/16 |
| | | | | 335/306 |
| 8,354,636 B2 | * | 1/2013 | Nakano | H01J 49/0495 |
| | | | | 250/281 |
| 10,607,808 B2 | * | 3/2020 | Huang | H01J 37/16 |
| 10,872,754 B2 | * | 12/2020 | Bullock | H01J 49/0495 |
| 2015/0192503 A1 | * | 7/2015 | Sekine | B25J 21/02 |
| | | | | 435/309.1 |
| 2019/0250564 A1 | | 8/2019 | Mishima et al. | |

FOREIGN PATENT DOCUMENTS

| CN | 105891318 A | * | 8/2016 | |
| CN | 207233697 U | * | 4/2018 | .......... H01J 49/0409 |
| CN | 108022822 B | * | 8/2019 | ............. H01J 49/04 |
| CN | 209880538 U | * | 12/2019 | |

\* cited by examiner

*Primary Examiner* — Catherine A Kelly

(57) ABSTRACT

The disclosure provides a cabin door structure including a sample inlet arranged on a top cover and a cabin door mounted on an outside of the sample inlet. The cabin door is provided with a protrusion, and the protrusion extends inwards into the sample inlet when the cabin door covering on the sample inlet. A distance from an inner surface of the protrusion to an inner surface of the top cover is less than a thickness of a target panel. In the cabin door structure of the disclosure, the distance from the inner surface of the protrusion to the inner surface of the top cover is set to be less than the thickness of the target panel.

14 Claims, 4 Drawing Sheets

VACUUM CHAMBER AND CABIN DOOR STRUCTURE

CROSS REFERENCE TO RELATED APPLICATIONS

The present application is a Continuation Application of PCT application No. PCT/CN2021/096737 filed on May 28, 2021, which claims the benefit of CN202011063421.0 filed on Sep. 30, 2020. All the above are hereby incorporated by reference for all purposes.

TECHNICAL FIELD

The disclosure relates to a vacuum chamber, specifically relates to a vacuum chamber and a cabin door structure.

BACKGROUND

The cabin door structure of the conventional vacuum chamber generally includes a sample inlet arranged on the top cover and a cabin door covering on the outside of the sample inlet. A sealing structure such as a sealing ring is arranged between the cabin door and the sample inlet. When in use, the tray for target panel is moved to the inside of the sample inlet, the cabin door is opened and the target panel is placed in the target panel groove of the tray, then the cabin door is closed and vacuuming is carried out.

Although the cabin door structure of the conventional vacuum chamber can meet the requirements to a certain extent, it still has the following deficiencies:
1. It is impossible to detect whether the sample is correctly placed in the target panel groove, and when the target panel is not correctly mounted in the target panel groove, the cabin door structure can still be closed smoothly;
2. A vacuum space is formed between the tray, the sample inlet and the cabin door, and a volume of the vacuum space is relatively large, which reduces the vacuuming efficiency.

SUMMARY

The disclosure provides a vacuum chamber and a cabin door structure, which can be used to detect whether the target panel is correctly mounted in the target panel groove.

The disclosure provides the cabin door structure, the cabin door structure includes a sample inlet arranged on a top cover and a cabin door covering the sample inlet from the outside of the sample inlet. The cabin door is provided with a protrusion, and the protrusion extends into the sample inlet when the cabin door covering on the sample inlet. A distance from an inner surface of the protrusion to an inner surface of the top cover is less than a thickness of a target panel.

In some embodiments, an outer surface of the cabin door is provided with a handle mechanism, the handle mechanism includes a handle, a limiting mounting mechanism is arranged between the handle and the cabin door to restrict a maximum distance from the handle to the cabin door and enable the cabin door to move within the maximum distance relative to the handle.

In some embodiments, at least one pressure spring to apply inward pressure on the cabin door is arranged between the handle and the cabin door.

In some embodiments, a first pressure spring groove and a second pressure spring groove are respectively arranged between the handle and the cabin door, and two ends of the pressure spring are mounted in the first pressure spring groove and the second pressure spring groove respectively.

In some embodiments, the limiting mounting mechanism includes a connecting block fixedly mounted on an outer surface of the cabin door, limiting pins are respectively arranged at both ends of the connecting block, an inner surface of the handle is provided with a mounting groove covering the connecting block, two side walls of the mounting groove are respectively provided with limiting holes corresponding to the limiting pin, the limiting pin is provided with a limiting segment extending into the corresponding limiting hole, and a length of the limiting hole in a direction perpendicular to the outer surface of the cabin door is greater than an outer diameter of the limiting segment and the limiting segment is enabled to slide along the limiting hole in the direction perpendicular to the outer surface of the cabin door.

In some embodiments, the length of the limiting hole in a direction parallel to the outer surface of the cabin door and perpendicular to an axis of the limiting pin is greater than the outer diameter of the limiting section, and the limiting section is enabled to slide along the limiting hole in the direction parallel to the outer surface of the cabin door and perpendicular to the axis of the limiting pin.

In some embodiments, both ends of the connecting block are respectively provided with a pin hole, the limiting pin is mounted in the corresponding pin hole, and an ejection spring to enable the corresponding limiting pin to eject toward the corresponding limiting hole is arranged in the pin hole.

In some embodiments, a section of the limiting pin located in the pin hole is limitedly fitted with the limiting hole.

In some embodiments, the handle mechanism includes a hinge base fixedly mounted on the top cover, and a first end of the handle is hingedly connected with the hinge base.

In some embodiments, a magnetic attraction structure is arranged between a second end of the handle and the top cover, and the magnetic attraction structure includes a magnet and a magnetic sensor.

In some embodiments, the hinge base is provided with a first tension spring shaft, the handle is provided with a second tension spring shaft, a tension spring is arranged between the first tension spring shaft and the second tension spring shaft, and when the cabin door is covered on the sample inlet, a hinge connecting shaft between the handle and the hinge base is located on an outside of the first tension spring shaft.

In some embodiments, a sum of the maximum distance from the handle to the cabin door and the distance from the inner surface of the protrusion to the inner surface of the top cover is less than the thickness of the target panel.

In some embodiments, a flexible pad is arranged on the inner surface of the protrusion, and a distance from the flexible pad to the inner surface of the top cover is less than the thickness of the target panel.

In some embodiments, at least one first sealing ring is arranged between the cabin door and the top cover.

The disclosure further provides a vacuum chamber, including a top cover. The top cover is provided with the cabin door structure mentioned above.

In some embodiments, the vacuum chamber further includes a tray for target panel capable of moving to directly below the sample inlet, and the tray for target panel is provided with a target panel groove to accept the target panel.

In some embodiments, at least one second sealing ring is arranged between the inner surface of the top cover and the tray for target panel.

Beneficial effects of the disclosure are:

In the cabin door structure of the disclosure, the distance from the inner surface of the protrusion to the inner surface of the top cover is set to be less than the thickness of the target panel, in this way, when the target panel is not mounted correctly, the raised inner surface of the protrusion will interfere with the target panel, thereby causing the cabin door to fail to close normally, which means that the cabin door structure of the disclosure can detect whether the target panel is correctly mounted in the target panel groove. In addition, when there is a slight error in a mounting position of the target panel, during a closing process of the cabin door, the protrusion may be pressed on the target panel to straighten the target panel so that it may be correctly mounted in the target panel groove, and can also play a role in correcting deviation.

Through arranging the limiting mounting mechanism between the handle and the cabin door, the limiting mounting mechanism is used to restrict the maximum distance from the handle to the cabin door, thereby controlling a moving distance of the cabin door relative to the handle in the direction perpendicular to the outer surface, which avoids a rigid collision between the protrusion arranged on the cabin door and the target panel. Further, through arranging a pressure spring between the handle and the cabin door, the pressure spring applies an elastic force on the cabin door towards the inside. On one hand, it plays a role of a pre-pressure on the cabin door to cover the sample inlet, on the other hand, it may shrink and give way when the target panel is not mounted correctly, so as to avoid the rigid collision between the protrusion and the target panel.

Further, the sum of the maximum distance from the handle to the cabin door and the distance from the inner surface of the protrusion to the inner surface of the top cover is set to be less than the thickness of the target panel, when the target panel is mounted incorrectly, even when the cabin door moves to the outside relative to the handle and fits with the handle, the cabin door still may not be closed, which can improve the detection reliability.

The length of the limiting hole in the direction parallel to the outer surface of the cabin door and perpendicular to the axis of the limiting pin is set to be greater than the length of the limiting section, and the limiting section may slide in the direction parallel to the outer surface of the cabin door and perpendicular to the axis of the limiting pin, which means that the cabin door may move in a direction parallel to its outer surface relative to the handle, in this way, the protrusion may be moved to adjust its position to better enter the sample inlet, which avoids an interference between the protrusion and the side wall of the sample inlet, and enables the geometric size of the protrusion to be closer to a geometric size of the sample inlet, so that the protrusion occupies more space in the sample inlet.

The cabin door structure of the disclosure further has the following technical effects:

1. A tension spring is arranged between the hinge base and the handle, and the hinge connecting shaft is located outside the tension spring when the cabin door is closed, in this way, the tension spring applies a torque on the handle to drive the cabin door to close, which keeps the cabin door closed. When the cabin door is opened, the tension spring may rotate to an outside of the hinge connecting shaft, and apply a torque to the cabin door to keep it open to balance the gravity of the cabin door and the handle, so that the cabin door may be kept open at a proper position for easy loading of samples etc.

2. A magnetic attraction structure is arranged between the handle and the top cover. On one hand, a magnetic force may enhance a closing pressure of the cabin door, and on the other hand, the magnetic sensor may detect whether the cabin door is closed in place.

3. Through arranging the protrusion, a large amount of space in the sample inlet can be occupied, and a volume of a vacuum area formed among the tray for target panel, the cabin door and the sample inlet is greatly reduced, which reduces the difficulty in vacuuming and improves efficiency.

BRIEF DESCRIPTION OF THE DRAWINGS

In order to enable the purpose, technical scheme and beneficial effect of the disclosure to be clearer, the disclosure provides the following drawings for illustration.

PART NUMBER DESCRIPTION

1—top cover, 2—sample inlet, 3—cabin door, 4—protrusion, 5—target panel, 6—handle, 7—tension spring, 8—first pressure spring groove, 9—second pressure spring groove, 10—connecting block, 11—limiting pin, 11*a*—limiting segment, 12—mounting groove, 13—limiting hole, 14—pin hole, 15—ejection spring, 16—hinge base, 17—magnetic sensor, 18—first tension spring shaft, 19—second tension spring shaft, 21—hinge connecting shaft, 22—tray for target panel, 23—target panel groove, 24—second sealing ring, 25—first sealing ring.

DETAILED DESCRIPTION

The disclosure will be further described below in conjunction with the accompanying drawings and specific embodiments, so that those skilled in the art may better understand the disclosure and implement it, but the embodiments given are not intended to limit the disclosure.

Figure 1:
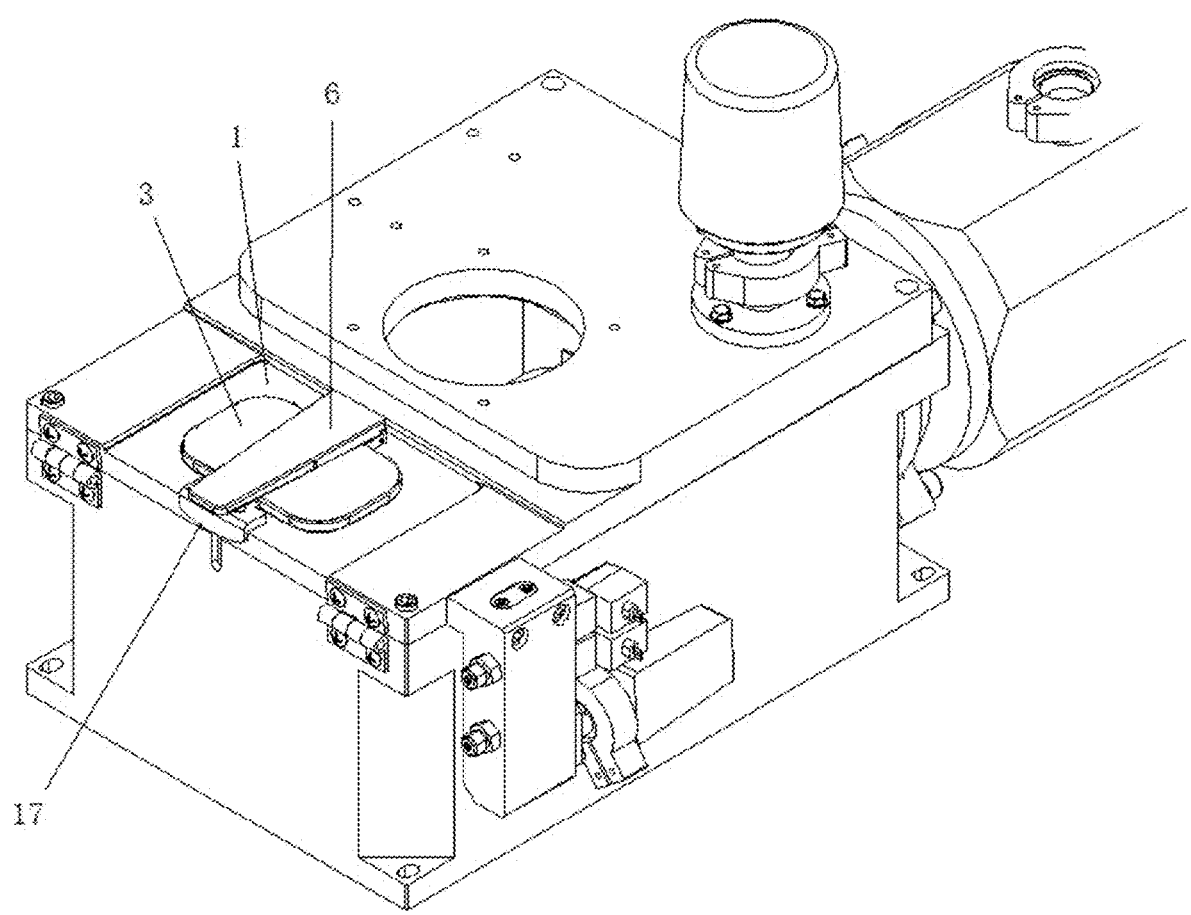
FIG. 1 is a structural schematic view of a vacuum chamber in an embodiment of the disclosure.
Figure 2:
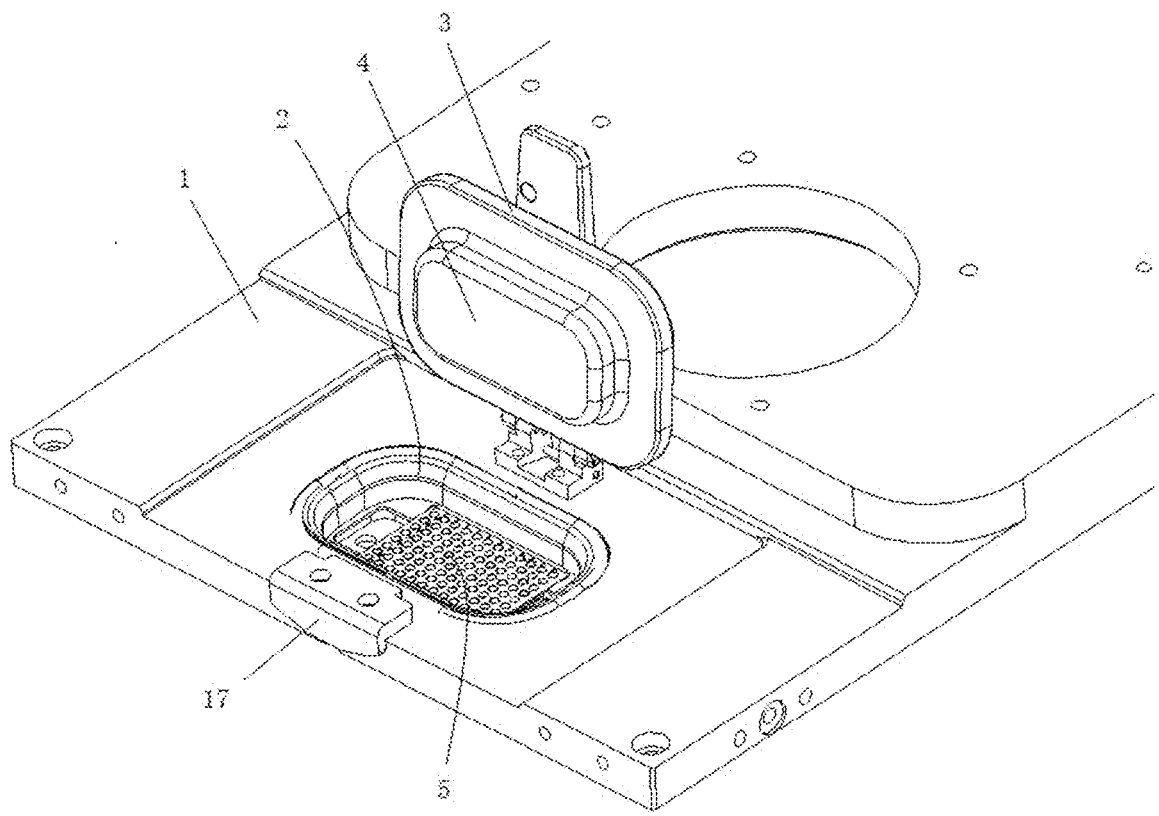
FIG. 2 is a structural schematic view of a top cover and a cabin door structure.
Figure 3:
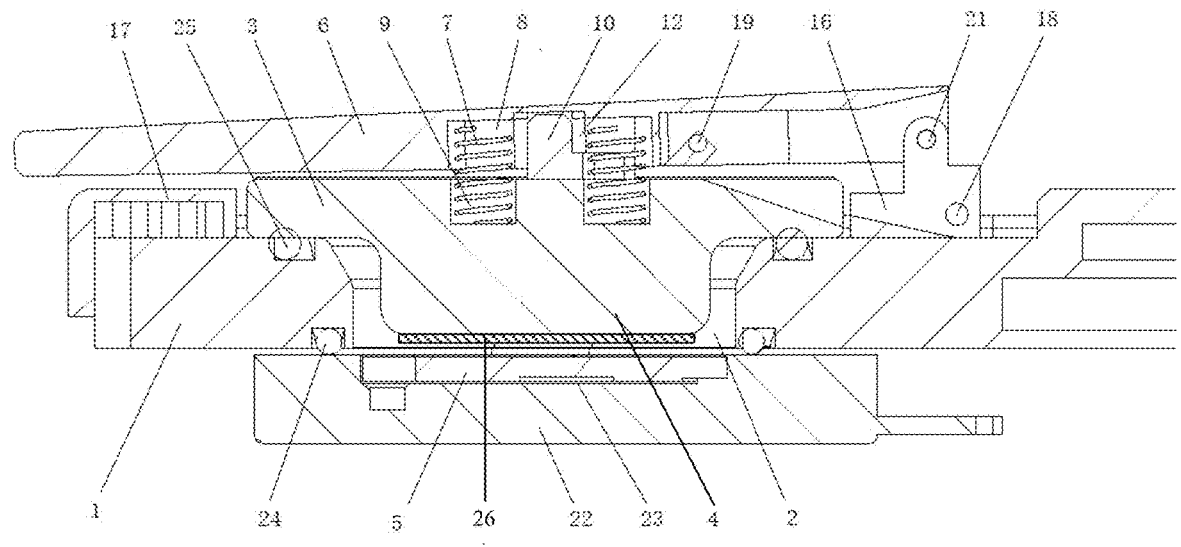
FIG. 3 is a sectional view of the top cover and the cabin door structure.
Figure 4:
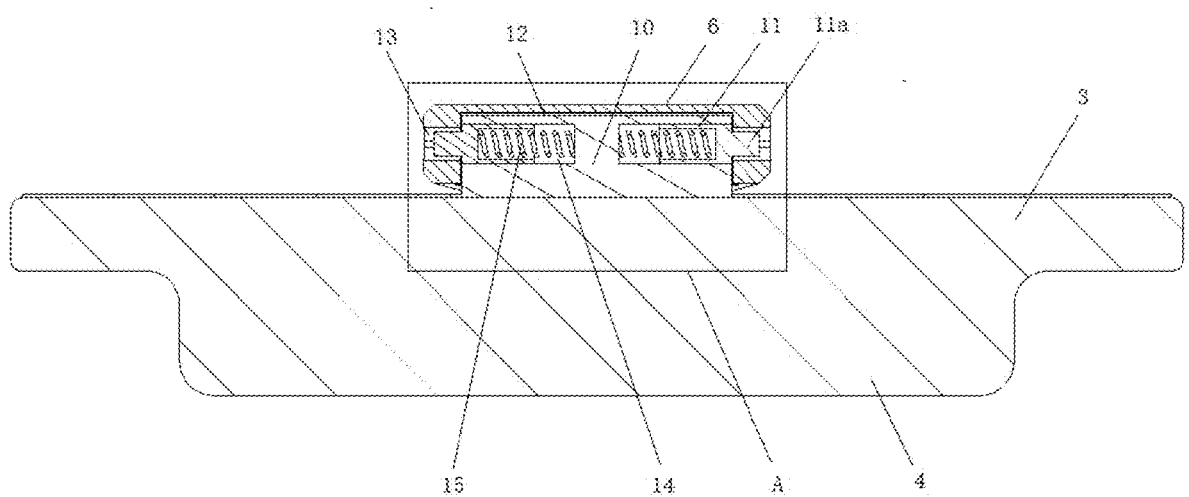
FIG. 4 is a structural schematic view of the cabin door structure.
Figure 5:
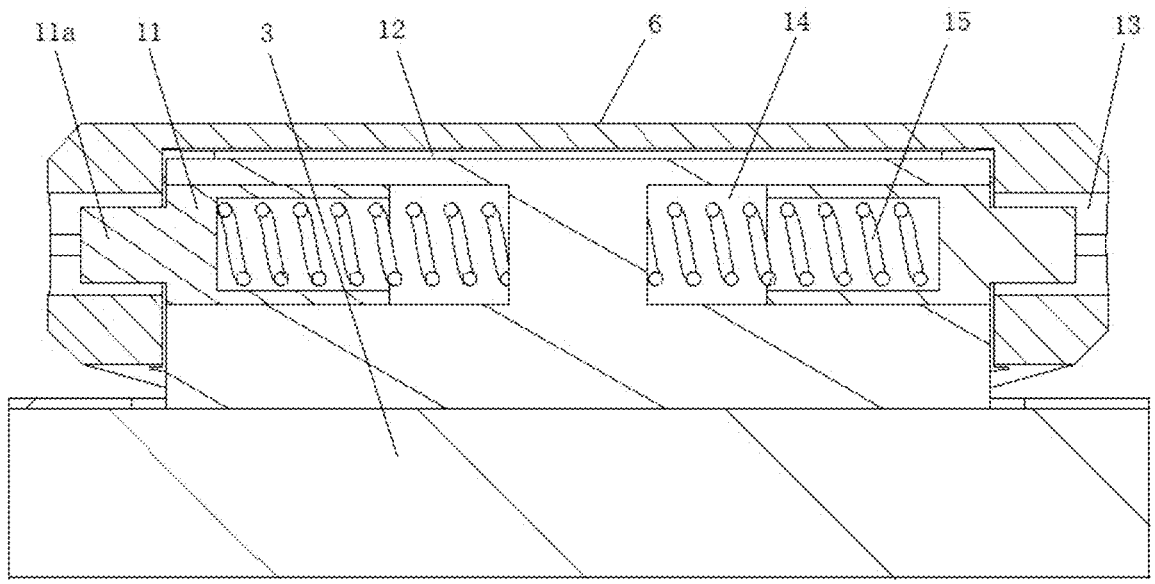
FIG. 5 is a detailed view of A part of FIG. 4.
Figure 6:
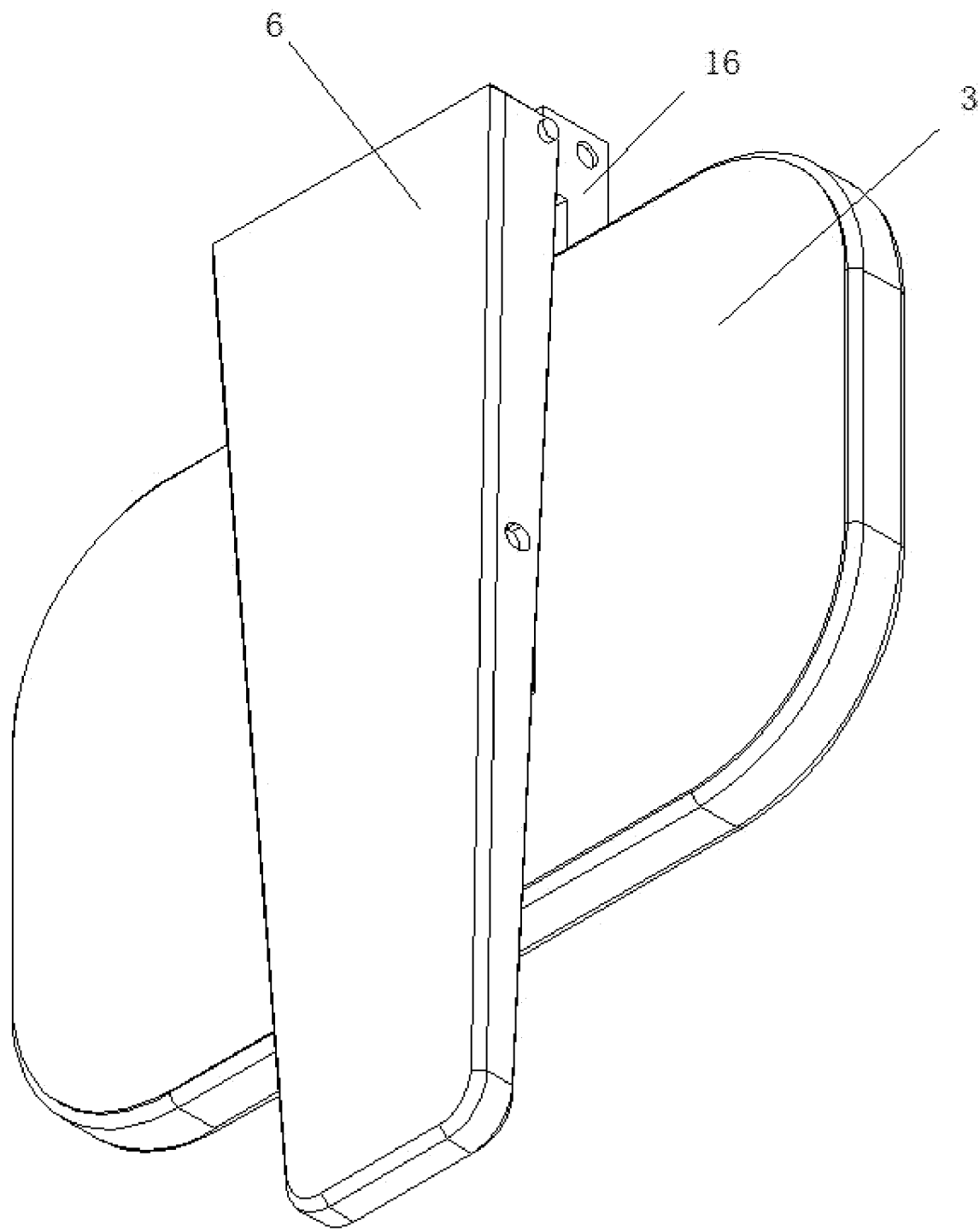
FIG. 6 is a perspective view of the cabin door structure.

Please refer to FIG. 1. FIG. 1 is a structural schematic view of a vacuum chamber in an embodiment of the disclosure. The vacuum chamber of this embodiment includes a top cover 1 and a cabin door structure is arranged on the top cover 1. Specifically, the cabin door structure of this embodiment includes a sample inlet 2 arranged on the top cover 1 and a cabin door 3 mounted on an outside of the sample inlet 2. The cabin door 3 is provided with a protrusion 4, and the protrusion 4 extends inwardly into the sample inlet 2 when the cabin door 3 is mounted and covers on the sample inlet 2. A distance from an inner surface of the protrusion 4 to an inner surface of the top cover 1 is less than a thickness of the target panel 5. In the cabin door structure of this embodiment, the distance from the inner surface of the protrusion 4 to the inner surface of the top cover 1 is set to be less than the thickness of the target panel 5, so that when the target panel 5 is not mounted correctly, the inner surface of the protrusion 4 will interfere with the target panel 5, thereby causing the cabin door 3 to fail to close normally, which means that the cabin door structure of this embodiment can detect whether the target panel 5 is correctly mounted in the target panel groove 23. In addition, when there is a slight error in a mounting position of the target panel 5, during a closing process of the cabin door 3, the protrusion 4 may be pressed on the target panel 5, and the target panel 5 is pressed upright so that it is correctly mounted in the target panel groove 23 and plays a role in correcting deviation. The protrusion 4 can occupy a large amount of space in the sample inlet, and a volume of a vacuum area formed among the tray for target panel, the cabin door and the sample inlet is greatly reduced, which reduces a difficulty of vacuuming and improving efficiency.

Further, an outer surface of the cabin door 3 is provided with a handle mechanism. The handle mechanism includes a handle 6, and a limiting mounting mechanism is arranged between the handle 6 and the cabin door 3. The limiting mounting mechanism is used to restrict a maximum distance from the handle 6 to the cabin door 3, and enable the cabin door 3 to move relative to the handle 6 within the maximum distance. Specifically, at least one pressure spring 7 for applying an inward pressure on the cabin door 3 is arranged between the handle 6 and the cabin door 3. Specifically, a first pressure spring groove 8 and a second pressure spring groove 9 are correspondingly arranged between the handle 6 and the cabin door 3. Two ends of the pressure spring 7 are mounted in the first pressure spring groove 8 and the second pressure spring groove 9 respectively. Two pressure springs 7 are arranged between the handle 6 and the cabin door 3 of the disclosure. The pressure springs 7 applies the inward pressure to the cabin door 3, and when the cabin door receives an effect of an outward force, the cabin door 3 may move outwardly and compress the pressure spring 7, so that a flexible structure is formed between the cabin door 3 and the handle 6 to avoid rigid collision.

Further, the limiting mounting mechanism of this embodiment includes a connecting block 10 fixedly mounted on an outer surface of the cabin door 3. Both ends of the connecting block 10 are respectively provided with limiting pins 11. The inner surface of the handle 6 is provided with a mounting groove 12 covering an outside of the connecting block 10, and two side walls of the mounting groove 12 are respectively provided with limiting holes 13 corresponding to the limiting pins 11. The limiting pin 11 is provided with a limiting segment 11*a* extending into the corresponding limiting hole 13, a length of the limiting hole 13 in a direction perpendicular to the outer surface of the cabin door 3 is greater than an outer diameter of the limiting segment 11*a*, and the limiting segment 11*a* may slide along the limiting hole 13 in the direction perpendicular to the outer surface of the cabin door 3. Further, the length of the limiting hole 13 in a direction parallel to the outer surface of the cabin door 3 and perpendicular to an axis of the limiting pin 11 is greater than the outer diameter of the limiting segment 11*a*, and the limiting segment 11*a* may slide along the limiting hole 13 in a direction parallel to the outer surface of the cabin door 3 and perpendicular to the axis of the limiting pin 11. The limiting hole 13 in this embodiment is circular, and an inner diameter of the limiting hole 13 is greater than an inner diameter of the limiting segment 11*a*, so that it is ensured that the limiting segment 11*a* may move in the limiting hole 13 along a direction parallel to the outer surface of the cabin door 3 and perpendicular to the outer surface of the cabin door 3, which means that the cabin door 3 may move relative to the handle 6 in directions parallel to the outer surface of the cabin door 3 and perpendicular to the outer surface of the cabin door 3. Of course, a shape and structure of the limiting hole 13 may also be realized in many other ways, such as rectangle, cross, etc., which will not be repeated here.

Further, two ends of the connecting block 10 in this embodiment are respectively provided with pin holes 14, and the limiting pins 11 are mounted in the corresponding pin holes 14. The pin hole 14 is provided with an ejection spring 15 for pushing the corresponding limiting pin 11 out toward the corresponding limit hole 13. Through arranging the pin hole 14 and the ejection spring 15, on the one hand, an assembly between the connecting block 10 and the handle 6 is facilitated, and on the other hand, the limiting segment 11*a* may always be kept in the limiting hole 13. In this embodiment, a section of the limiting pin 11 located in the pin hole 14 is limitedly matched with the limiting hole 13 to prevent the limiting pin 11 from being pushed out of the pin hole 14 by the ejection spring 15.

Further, the handle mechanism of this embodiment further includes a hinge base 16 fixedly mounted on the top cover 1, and one end of the handle 6 is hingedly connected with the hinge base 16. That is, the handle 6 of this embodiment rotates around a hinge connecting shaft 21 between the handle 6 and the hinge base 16, thereby realizing an opening and closing of the cabin door 3. In this embodiment, a magnetic attraction structure is arranged between the other end of the handle 6 and the top cover 1. The magnetic attraction structure includes a magnet and a magnetic sensor 17, and the magnet and the magnetic sensor 17 may be mounted on the handle 6 and the top cover 1 respectively, or can be mounted on the handle 6 or the top cover 1 at the same time. Both the magnet and the magnetic sensor 17 of this embodiment are mounted on the top cover 1. Through arranging a magnetic attraction structure between the handle and the top cover, on one hand, a magnetic force may enhance a closing pressure of the cabin door, and on the other hand, the magnetic sensor may detect whether the cabin door is closed properly.

Further, the hinge base 16 is provided with a first tension spring shaft 18, the handle 6 is provided with a second tension spring shaft 19, and a tension spring is arranged between the first tension spring shaft 18 and the second tension spring shaft 19. When the cabin door 3 is covered on the sample inlet 2, the hinge connecting shaft 21 between the handle 6 and the hinge base 16 is located outside the first tension spring shaft 18. The tension spring (not shown) is arranged between the hinge base 16 and the handle 6, and the hinge connecting shaft 21 is positioned at an outside of the tension spring when the cabin door 3 is closed. In this way, the tension spring applies a torque to the handle 6 to drive the cabin door 3 to close, so that the cabin door 3 remains closed. When the cabin door 3 is opened, the tension spring could be rotated to an outside of the hinge connecting shaft 21, and the cabin door 3 is applied with a torque that kept it open to balance gravitational effects of the cabin door 3 and the handle 6, etc., so that the cabin door 3 is kept open at a suitable position to facilitate operations such as adding samples.

Further, a sum of the maximum distance from the handle 6 to the cabin door 3 in this embodiment and the distance from the inner surface of the protrusion 4 to the inner surface of the top cover 1 is less than the thickness of the target panel 5, which means that when the target panel 5 is mounted incorrectly, even if the cabin door 3 moves outward relative to the handle 6 and fits together, the cabin door 3 may not be closed normally, which improves a detection accuracy. In some embodiments, a flexible pad may further be arranged on the inner surface of the protrusion 4. A distance from the flexible pad to the inner surface of the top cover 1 is less than the thickness of the target panel 5, which further avoids a rigid collision between the protrusion 4 and the target panel 5.

Further, the vacuum chamber of this embodiment further includes a tray for target panel 22 that may run to directly below the sample inlet 2, and the tray for target panel 22 is provided with a target panel groove 23 for mounting the target panel 5.

Further, at least one first sealing ring 25 is arranged between the cabin door 3 and the top cover 1, and at least one second sealing ring 24 is arranged between the inner surface wall of the top cover 1 and the tray for target panel 22, so as to ensure airtightness during vacuuming.

It should be noted that the "outer surface" mentioned in this specification refers to a side where the cabin door 3 is located relative to the top cover 1, and the "inner surface" refers to a side where the tray for target panel 22 is located relative to the top cover 1, and the two sides of the top cover 1 are respectively "inner surface" and "outer surface".

The above-mentioned embodiments are only preferred embodiments for fully illustrating the disclosure, and a protection range of the disclosure is not limited thereto. Equivalent substitutions or transformations made by those skilled in the art on the basis of the disclosure are all within the protection range of the disclosure. The protection range of the disclosure shall be determined by the claims.

What is claimed is:

1. A cabin door structure, comprising:
   a sample inlet (2) arranged on a top cover (1), and
   a cabin door (3) covering the sample inlet (2) from the outside,
   wherein,
   the cabin door (3) is provided with a protrusion (4) extending into the sample inlet (2) when the cabin door (3) is closed, a distance from an inner surface of the protrusion (4) to an inner surface of the top cover (1) is less than a thickness of a target panel (5);
   an outer surface of the cabin door (3) is provided with a handle mechanism which comprises a handle (6), and a limiting mounting mechanism is arranged between the handle (6) and the cabin door (3) to restrict a maximum distance from the handle (6) to the cabin door (3) and enable the cabin door (3) to move within the maximum distance relative to the handle (6);
   the limiting mounting mechanism comprises a connecting block (10) fixedly mounted on the outer surface of the cabin door (3), the connecting block (10) connects the handle (6) with the cabin door (3) in an upper and lower directions, limiting pins (11) are respectively arranged at both ends of the connecting block (10), an inner surface of the handle (6) is provided with a mounting groove (12) covering the connecting block (10), two side walls of the mounting groove (12) are respectively provided with limiting holes (13) corresponding to the limiting pin (11), the limiting pin (11) is provided with a limiting segment (11a) extending into the corresponding limiting hole (13), and a length of the limiting hole (13) in a direction perpendicular to the outer surface of the cabin door (3) is greater than an outer diameter of the limiting segment (11a) and the limiting segment (11a) is enabled to slide along the limiting hole (13) in the direction perpendicular to the outer surface of the cabin door (3);
   a length of the limiting hole (13) in a direction parallel to the outer surface of the cabin door (3) and perpendicular to an axis of the limiting pin (11) is greater than the outer diameter of the limiting section (11a), and the limiting section (11a) is enabled to slide along the limiting hole (13) in the direction parallel to the outer surface of the cabin door (3) and perpendicular to the axis of the limiting pin (11), and
   the connecting block (10) is configured to drive the cabin door (3) to slide relative to the handle (6) in front-rear and left-right directions parallel to the outer surface of the cabin door (3) and perpendicular to the outer surface of the cabin door (3) in an up-down direction so as to adjust the protrusion (4) to better enter the sample inlet.

2. The cabin door structure according to claim 1, wherein at least one pressure spring (7) inwardly applying pressure to the cabin door (3) is arranged between the handle (6) and the cabin door (3).

3. The cabin door structure according to claim 2, wherein a first pressure spring groove (8) and a second pressure spring groove (9) are respectively arranged between the handle (6) and the cabin door (3), and two ends of the pressure spring (7) are mounted in the first pressure spring groove (8) and the second pressure spring groove (9) respectively.

4. The cabin door structure according to claim 1, wherein both ends of the connecting block (10) are respectively provided with a pin hole (14), the limiting pin (11) is mounted in the corresponding pin hole (14), and an ejection spring (15) to enable the corresponding limiting pin (11) to eject toward the corresponding limiting hole (13) is arranged in the pin hole (14).

5. The cabin door structure according to claim 4, wherein a section of the limiting pin (11) located in the pin hole (14) is limitedly fitted with the limiting hole (13).

6. The cabin door structure according to claim 1, wherein the handle mechanism comprises a hinge base (16) fixedly mounted on the top cover (1), and a first end of the handle (6) is hingedly connected with the hinge base (16).

7. The cabin door structure according to claim 6, wherein a magnetic attraction structure is arranged between a second end of the handle (6) and the top cover (1), and the magnetic attraction structure comprises a magnet and a magnetic sensor (17).

8. The cabin door structure according to claim 6, wherein the hinge base (16) is provided with a first tension spring shaft (18), the handle (6) is provided with a second tension spring shaft (19), a tension spring is arranged between the first tension spring shaft (18) and the second tension spring shaft (19), and when the cabin door (3) is closed, a hinge connecting shaft (21) between the handle (6) and the hinge base (16) is located on an outside of the first tension spring shaft (18).

9. The cabin door structure according to claim 1, wherein a sum of the maximum distance from the handle (6) to the cabin door (3) and the distance from the inner surface of the protrusion (4) to the inner surface of the top cover (1) is less than the thickness of the target panel (5).

10. The cabin door structure according to claim 1, wherein a flexible pad (26) is arranged on the inner surface of the protrusion (4), and a distance from the flexible pad (26) to the inner surface of the top cover (1) is less than the thickness of the target panel (5).

11. The cabin door structure according to claim 1, wherein at least one first sealing ring (25) is arranged between the cabin door (3) and the top cover (1).

12. A vacuum chamber, comprising:
the top cover (1),
wherein, the cabin door structure according to claim 1 is arranged on the top cover (1).

13. The vacuum chamber according to claim 12, further comprising a tray for target panel (22) capable of moving to directly below the sample inlet (2), wherein
the tray for target panel (22) is provided with a target panel groove (23) to accept the target panel (5).

14. The vacuum chamber according to claim 12, wherein at least one second sealing ring (24) is arranged between an inner surface wall of the top cover (1) and the tray for target panel (22).

* * * * *